Oct. 2, 1934.  R. SCHWEICH  1,975,733
POWER TRANSMISSION DEVICE
Filed June 14, 1933
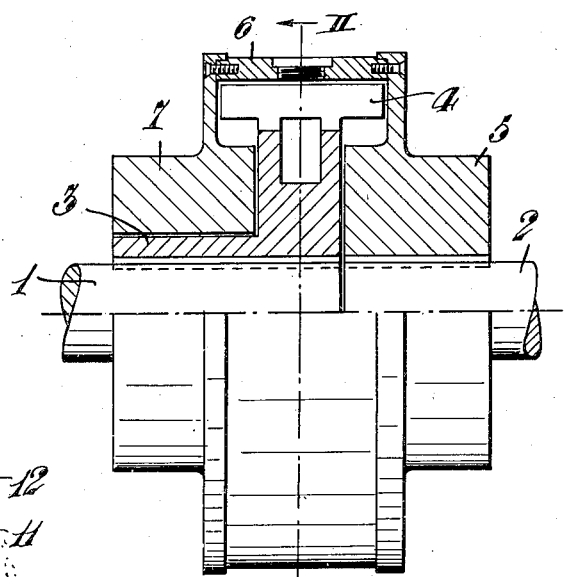
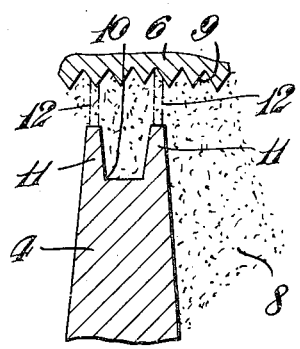
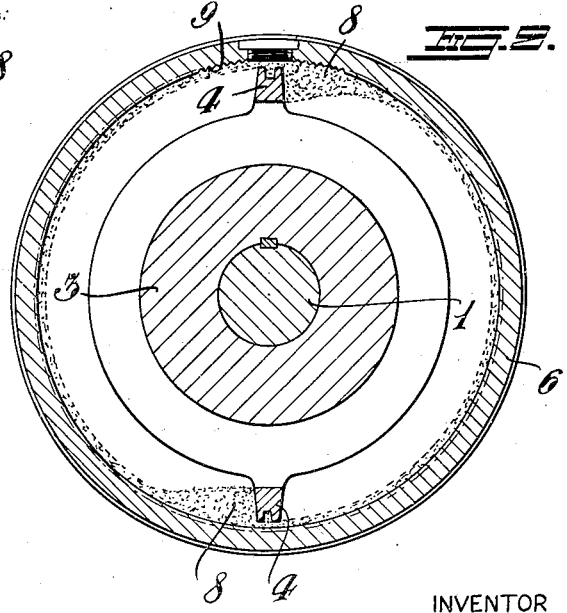
INVENTOR
Roger Schweich
BY
ATTORNEY Patented Oct. 2, 1934

1,975,733

UNITED STATES PATENT OFFICE 1,975,733

POWER TRANSMISSION DEVICE

Roger Schweich, Paris, France, assignor to Pulvis Aktiengesellschaft, Glarus, Switzerland, a corporation of Switzerland Application June 14, 1933, Serial No. 675,774
In France June 17, 1932

5 Claims. (Cl. 192—58)

This invention relates to power transmitting devices of the kind in which the transmission of power from a driving shaft to a driven member rotatable with respect to said shaft is accomplished by the aid of a finely divided material acted on by blades carried by said driving shaft within a chamber formed within the driven member. More particularly the invention has reference to slipping clutches the operation of which is based upon this power transmitting method.

In clutches of this kind there is, of course, a certain clearance between the blades and the inner surface of the driven member, and said clearance too, varies in conformity with the transversal displacements of the driving and driven members with relation to each other. It is known that the movement of the driven member is secured by the aid of drifts which collect in front of each blade, and that slippage in the clutch does not take place between the outermost granules and the inner surface of the driven member, but within a layer of the material adjacent said surface. As a result, said inner surface of the driven member will be covered by a layer of finely divided material which forms, practically, a solid mass integral with the driven member, because it is not carried along by the blades. The thickness of this layer corresponds, as a rule, to the clearance between the top surface of the blades and the inner surface of the driven member. As, on the other hand, the blades should have a sufficient thickness to be able to resist the stresses to which they are subjected as result of the power transmission, they should be rather thick even at their outer end, with the resulting formation between the inner surface of the driven member and the top end of a moving blade, of a sort of wall of large thickness of the material situated in said region which, practically, forms a fixed body integral with the driven member. Said wall, consequently, tends to bring about a rigid connection between the driven member and the driving blades, thereby interfering with the normal operation of the slipping clutch.

According to the invention, the formation of a rigid connection between the driven member and the blades may be avoided by the provision at the top end of the blades, of a central groove the depth of which is rather great with relation to the distance between the inner surface of the driven member and the top end of the blade, but rather small as compared with the operative height of the blade, in order that the purpose of the invention may be obtained without decreasing to any appreciable degree the bending strength of the blade. Experiments have proved that under these circumstances, the mass of finely divided material contained in the groove thus produced is of too great a height to be able to form a rigid connection between the driven member and the blade, the function of the clutch being, therefore, much more satisfactory than it was heretofore.

In the accompanying drawing, Fig. 1 is a side elevation, partly in section, of a clutch coupling embodying this invention. Fig. 2 is a cross section on the line II—II of Fig. 1, and Fig. 3 is a cross section of part of the driven member and the outermost part of a blade.

With reference to Figs. 1 and 2, 1 is a driving shaft and 2 a shaft to be driven by the aid of a slipping clutch of the type above indicated. Said clutch is shown in a conventional way only in the drawing. Secured to the driving shaft 1 is a hub 3, carrying a pair of radially and axially extending blades 4, though it should be noted that a different number of blades may be provided. Secured to the driven shaft 2 is a hub 5 which carries a cylindrical drum 6, said drum being also carried by bearing on a part 7 rotatably mounted on the hub 3. The coupling can also be made without any bearing.

The drum 6 provides a cylindrical chamber within which the hub 3 with the blades 4 may rotate, clearance being left between the top surface of the blades and the cylindrical inner surface of the drum as well as between the end surface of the blades and the side walls of the drum. The drum 6 provides a cylindrical chamber which is partially filled with a finely divided material of a nature capable of being transformed into a solid mass under the action of the centrifugal force so as to be capable of transmitting power from the driving member, as represented by the blades 4, to the driven member, as represented by the drum 6. In the drawing, said finely divided material is indicated at 8, Figs. 2 and 3.

The driven member or drum 6 is formed with serrations on its inner surface, as shown at 9, in order to improve the engagement between the driven member and the finely divided material contained in the cylindrical working chamber. The operation of a clutch of the type above set forth is well-known per se, and need not be described in detail, it being sufficient to state that a drift of the finely divided material will collect in front of each blade, as shown in Fig. 2.

According to the invention, the top end of the blades is formed with a groove 10 of a rather large cross section area so that only rather thin rib-like portions 11 of the blade remain on opposite sides of the groove.

As already stated, the finely divided material located in the space between the top end of a blade 4 and the inner surface of the driven member 6 may form a sort of wall, the thickness of which is somewhat less than that of the blade, and said wall may bring about a rigid connection between the driven member and the blade. By reason of the provision of the groove in the blade as above described and shown in the drawing (see particularly Fig. 3), such a wall acting as a rigid connection may only be produced right in front of the portions 11 of the blade on opposite sides of the groove 10, whereas the material between these walls does not effect such a rigid connection, as the bottom of the groove is too far from the inner surface of the drum. The wall hereinbefore referred to has thus been replaced, according to the invention, by two narrow columns which are indicated by dotted lines at 12, 12 in the drawing. As the thickness of said columns is somewhat less than that of the blade portions 11, because of the fact that their sides are retracted somewhat from the surfaces of the blade portions 11, it may readily be seen that, provided the dimensions of the various parts are properly chosen, the columns 12 will be too narrow to interfere with the proper function of the clutch to any extent worth mentioning.

Because the depth of the groove 10 is small as compared with the operative height of the blade 4, the bending strength of the blade will not be reduced appreciably as result of the provision of the groove. If, furthermore, the portion 11 in front of which the drift of finely divided material collects, is worn off at its top end due to the sliding friction, then the other portion 11 will become driving, as far as an area thereof is concerned which is of the same size as the worn off area of the said first mentioned portion 11, so that the torque transmitted will not be reduced save for an appreciable wear of both portions 11.

What I claim is:—

1. In a clutching device, a drum, an axially extending blade rotatably mounted in said drum, and a finely divided power transmitting material in said casing, said blade being formed with an axially extending groove in its top surface.

2. In a clutching device, a drum providing a cylindrical chamber, an axially extending blade rotatably mounted in said drum, and a finely divided material partially filling said chamber, said blade being formed with axially extending rib portions at its end facing the cylindrical surface of said chamber, said ribs presenting top surfaces of a small area as compared with the cross section area of the blade.

3. In a clutching device, a member providing a drum, another member rotatably mounted in said drum, said members providing a chamber therebetween, a set of blades carried by said other member within said chamber and a finely divided material in said chamber, said blades being formed at their end remote from the axis of the drum with axially extending grooves of a rather great depth bounded by portions of the blades which are of a small thickness as compared with the thickness of the remainder of the blade.

4. In a clutching device, a drum providing a cylindrical chamber, serrations on the cylindrical surface of said chamber, a member rotatably mounted in said drum, a set of blades carried by said member so as to extend nearly to the periphery of said chamber, and a finely divided material partially filling the chamber of the drum, said blades being formed with axially extending grooves in their end surfaces remote from the axis of the drum, said grooves being of a rather great depth and of a rather great width and being bounded in the transverse direction by narrow portions of the blade.

5. In a device of the kind described, a blade for moving a driven member through the intermedium of a finely divided material contained in a chamber in which the blade rotates, said blade having a radial driving surface for engaging said material and being formed with a comparatively deep groove extending parallel to the axis of rotation of the blade, said groove being bounded in the transverse direction by blade portions of a small thickness as compared with the thickness of the blade.

ROGER SCHWEICH.